United States
Castellion

[11] 3,807,832
[45] Apr. 30, 1974

[54] ELECTROCHROMIC (EC) MIRROR WHICH RAPIDLY CHANGES REFLECTIVITY

[75] Inventor: George Augustus Castellion, Stamford, Conn.

[73] Assignee: American Cyanamid Company, Stamford, Conn.

[22] Filed: Nov. 9, 1972

[21] Appl. No.: 305,205

[52] U.S. Cl. .......................... 350/160 R, 350/290
[51] Int. Cl. ............................................. G02f 1/28
[58] Field of Search .................... 350/160 R, 290

[56] References Cited
UNITED STATES PATENTS
3,453,038  7/1969  Kissa et al. .................... 350/160 R
3,578,843  5/1971  Castellion .................... 350/160 R

*Primary Examiner*—Ronald L. Wibert
*Assistant Examiner*—Paul K. Godwin
*Attorney, Agent, or Firm*—Charles J. Fickey

[57] ABSTRACT

Electro-optical device useful in modulation of reflected light, and the like, typically comprising an electrochromic device containing a reflecting mirror surface, said electrochromic device being a sandwich arrangement of a transparent electrode, an electrochromic layer, a reflecting and support layer disposed in a liquid electrolyte and a counterelectrode. The electrochromic device exhibits coloration and bleaching thereof at ambient temperature by control of the polarity of an applied electric field, whereby light reaching the reflecting layer electrode is modulated in intensity, thus modulating, in turn, the reflected light.

7 Claims, 3 Drawing Figures

3,807,832 ical field. More
ELECTROCHROMIC (EC) MIRROR WHICH RAPIDLY CHANGES REFLECTIVITY This invention is directed to electro-optical devices whose electromagnetic radiation transmission characteristics can be selectively altered by the influence of a photoelectrically controlled electrical field. More particularly this device relates to a mirror device with photoelectric control of light reflection comprising electrochromic materials, conductive electrolyte which exhibit good chemical and electrochemical stability, reversibility and reproducibility. Still more particularly this invention is concerned with a reflecting surface on a porous support in a liquid electrolyte disposed between electrodes.

In prior U.S. application, Ser. No. 530,086, filed Feb. 25, 1966, and Ser. No. 534,188, filed Mar. 14, 1966, and continuation-in-part applications thereof, and U.S. Pat. No. 3,521,921, there are described electro-optical devices exhibiting a phenomenon known as persistent electrochromism.

The term persistent electrochromism denotes the property of a material whereby its electromagnetic radiation absorption characteristic is altered, in most instances even at ambient temperature, under the influence of an electric field. Such materials, for example, may exhibit little or no absorption of visible wave lengths in the absence of an electric field and therefore be transparent, but when subjected to an electric field, effectively absorb in the red end of the spectrum, turning blue in color. Similar effects can be observed in other portions of the electromagnetic radiation spectrum, invisible as well as visible.

As described in the foregoing earlier applications, if a layer of a persistent electrochromic material is disposed between a pair of electrodes, across which a potential is applied, the radiation transmitting characteristics of the material will change. If the electrodes and the electrochromic layer are formed on the surface of a transparent substrate, such as glass, the light transmitting characteristics of the combination can be varied by controlling the electric field produced across the electrochromic material. On the substrate which originally is clear, i.e., presenting substantially no diminution of the light transmitting ability of the substrate, application of a voltage between the electrodes to establish an electric field of the proper polarity changes the light absorption characteristic of the electrochromic material, turning it darker, for example, thus decreasing the light transmitting ability of the entire assembly.

In copending commonly assigned applications Ser. No. 773,690, filed Dec. 25, 1968, and Ser. No. 99,909, filed Dec. 21, 1970, there are disclosed electro-optical mirror devices in which the mirror component was placed either on the backside of the cell or in which the mirror element served additionally as the counterelectrode. It has now been found that a very effective mirror structure is formed by the use of a reflecting layer on a porous substrate disposed in a liquid electrolyte between opposed electrodes of substantially the same size in a sandwich arrangement. Thereby very thin cells can be constructed so that the distance between electrode is short and the cell response time is rapid.

It is therefore an object of this invention to provide a reflecting mirror device capable of rapid and controlled coloration over a substantially large area. A further object of this invention is to provide a photoelectrically controlled mirror device which gives continuously variable light reflection as a function of light intensity thereby preventing accidental overdarkening of the device.

This and other objects of the invention will become apparent as the description thereof proceeds.

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

DETAILED DESCRIPTION OF THE INVENTION

ELECTROCHROMIC MATERIALS

The materials which form the electrochromic materials of the device in general are electrical insulators or semi-conductors. Thus are excluded those metals, metal alloys, and other metal-containing compounds which are relatively good electrical conductors.

While not wholly understood, it appears that coloration of the electrochromic materials must be accompanied by the uptake of positive counterions provided in the electrolyte.

The persistent electrochromic materials are further characterized as inorganic substances which are solid under the conditions of use, whether as pure elements, alloys, or chemical compounds, containing at least one element of the Periodic System which can exist in more than one oxidation state in addition to zero. The term "oxidation state" as employed herein is defined in "Inorganic Chemistry," T. Moeller, John Wiley & Sons, Inc., New York, 1952. These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfide of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are the following oxides: MO oxides (M representing the metal ion), e.g., MnO, NiO, CoO, etc.; $M_2O_3$ oxides, e.g., $Cr_2O_3$, $Fe_2O_3$, $Y_2O_3$, $Yb_2O_3$, $V_2O_4$, $Ti_2O_3$, $Mn_2O_3$, etc.; $MO_2$ oxides, e.g., $TiO_2$, $MnO_2$, $ThO_2$, $CrO_2$, etc.; $M_3O_4$ oxides, e.g., $Co_3O_4$, $Mn_3O_4$, $Fe_3O_4$, etc.; $MO_3$ oxides, e.g., $CrO_3$, $UO_3$, etc.; $M_2O_5$ oxides, e.g., $V_2O_5$, $Nb_2O_5$, $Ta_2O_5$, etc.; $M_4O_6$ oxides; $M_2O_7$ oxides such as $M_2O_7$; complex oxides such as those of the formula $XYO_2$ (X and Y being different metals). e.g., $LiNiO_2$, etc.; $XYO_3$ oxides, e.g., $LiMnO_3$, $FeTiO_3$, $MnTiO_3$, $CoTiO_3$, $NiTiO_3$, $LiNbO_3$, $LiTaO_3$, $NaWO_3$, etc.; $XYO_4$ oxides, e.g., $MgWO_4$, $CdWO_4$, $NiWO_4$, etc.; $XY_2O_6$, e.g., $CaNb_2O_6$ ("Niobite" oxides); $X_2Y_2O_6$, e.g., $Na_2Nb_2O_6$: Spinel structure oxides, i.e., of the formula $X_2YO_4$, e.g., $NaMoO_4$, $Ag_2MoO_4$, $Cu_2MoO_4$, $Li_2MoO_4$, $Li_2WO_4$, $Sr_2TiO_4$, $Ca_2MnO_4$, etc.; and $XY_2O_4$, e.g., $FeCr_2O_4$, $TiZn_2O_4$, etc.; $X_2YO_5$ oxides, e.g., $Fe_2TiO_5$, $Al_2TiO_5$, etc. For a discussion of some complex oxides, see "Advanced Inorganic Chemistry," Cotten & Wilkinson, p. 51, (1966), Interscience Publishers, Inc., New York and Progress in Inorganic Chem., Vol. 1, 465 (1959) Interscience Publishers, Inc., New York. Also included are nitrides, and the sulfides corresponding to the above oxides. Hydrates of certain metal oxides may also be used, e.g., $WO_3 \cdot H_2O$, $WO_3 \cdot 2H_2O$, $MoO_3 \cdot H_2O$ and $MoO_3 \cdot 2H_2O$.

The preferred electrochromic material for use with the liquid electrolyte of the present invention is a compound which contains at least one element selected from Group VA, VIA, VIIA of the Periodic Table of the elements and at least one cation from Groups IB, IIB to VIIIB including Lanthanide and Actinide series. Particularly advantageous materials are $WO_3$ and $MoO_3$.

An important advantage of devices of the invention containing electrolyte in contact with electrochromic material is applicability to large uniformly colored areas. The invention, therefore, permits numerous practical applications where control of visible and infrared absorption is desired to which prior art electro-optical devices are not susceptible as for example windows in homes, commercial buildings and automobiles.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optimum thickness will also be determined by the nature of the particular compound being laid down as films and by the film-forming method since the particular compound and film-forming method may place physical (e.g., non-uniform film surface) and economic limitations on manufacture of the devices.

The films may be laid down on any substrate which, relative to the film, is electrically non-conducting. Suitable substrate materials include glass, wood, paper, plastics, plaster, and the like, including transparent, translucent, opaque or other optical quality materials. A preferred embodiment in the instant device would employ at least one transparent electrode.

When the electric field is applied between the electrodes, a blue coloration of the previously transparent sandwich occurs, i.e., the persistent electrochromic layer becomes absorptive of electromagnetic radiation over a band encompassing the red end of the bisible spectrum, thereby rendering it bluish in appearance. Prior to the application of the electric field, it was essentially non-absorbent and thus transparent.

ELECTROLYTE

A conductive mixed liquid electrolyte is employed. The electrolyte comprises in combination with sulfuric acid a compatible dilutent for the acid. Any dilutent agent which is compatible with the electrochromic layer is suitable. Particularly advantageous dilutent agents are glycerine, ethylene glycol, polyvinyl alcohol and the like.

A preferred embodiment employs $H_2SO_4$ in combination with ethylene glycol. The properties of this mixture may be varied in advantageous manner by employing various ratios of alcohol to sulfuric acid concentration. Thereby liquid electrolytes can be produced to give a specific conductivity in the range of from about 0.10 to 0.60 ohm-$cm^{-1}$.

A distinct advantage of the above mentioned mixed liquid electrolytes is their high ionic conductivity, good chemical stability and substantial transparency. We have found that these requirements are unexpectedly met by electrolytes in the preferred conductivity range of $0.20 - 0.40$ ohm$^{-1}cm^{-1}$.

Furthermore, the liquid electrolytes used in the instant invention are substantially transparent so as to permit their use in a mirror device.

MIRROR ELEMENT

The mirror element comprises a thin reflecting film such as Au, Pd, Cr. Ag, or Pt from 10°–20° in thickness provided by vapor evaporation, electrodeposition, vacuum deposition or similar techniques on a porous insulating substrate. The porosity of the mirror substrate can be conveniently provided by use of material such as porous glass, sintered material or a perforated plastic support. The foraminous character of the mirror support permits electrolyte to so permeate the mirror substrate as to provide ionic contact between the electrodes. While the mirror element is physically disposed in the electrolyte between the electrodes it is electrically insulated therefrom and forms no part of the electrode system.

COUNTER ELECTRODE

If the cell is to be used as a light reflecting and modulating device, it employs at least one transparent electrode and a second counter electrode in contact with the solution of approximately the same area as the first electrode and located in parallel relationship. The counter electrode is one selected from a group of materials compatible with the electrolyte, as previously discussed, such as tungsten oxide or molybdenum oxide. The counter electrode structure of the present invention is formed from a mixture of an electrochromic, material as previously described, and a binder, such as unsintered, fibrillated polyfluoroalkylenes, e.g., polytetrafluoroethylene, polyhexafluoropropylene, and the like and copolymers thereof. The mixture also includes an electrically conductive material such as graphite and may include other polymeric materials such as polymethylmethacrylate and plasticizers therefor such as dicyclohexylphthlate. The mixture is blended on a heated mill and calandered into thin sheets. Two such sheets are then used with a metal screen between to from the final electrode structure. To do this, the layered structure is pressed under elevated temperature and pressure between metal pressure plates, for a short time, with cooling prior to pressure release. The plasticized polymethylmethacrylate is then extracted with acetone solvent, followed by water washing and drying. The finished structure forms a very effective and durable counter electrode for electrochromic cells.

In the previous arrangement of the components of the electrochromic cell, the counterelectrode was placed at the side. Thus color propogation was initiated from one side and proceeded across the cell requiring a longer time interval to develop full coloration. In the instant invention, the placement of the counterelectrode of an area approximately equal to the Ec film in direct and opposite relationship to the electrochromic electrode will result in the proprogation originating from many points of the opposite surface and much faster coloration.

While the original mirror took about one minute to develop full coloration, in the instant device full coloration develops in 15 seconds for an area 3½×5 inches.

The invention may be better understood by reference to the drawings which show embodiments of the invention.

Figure 1:
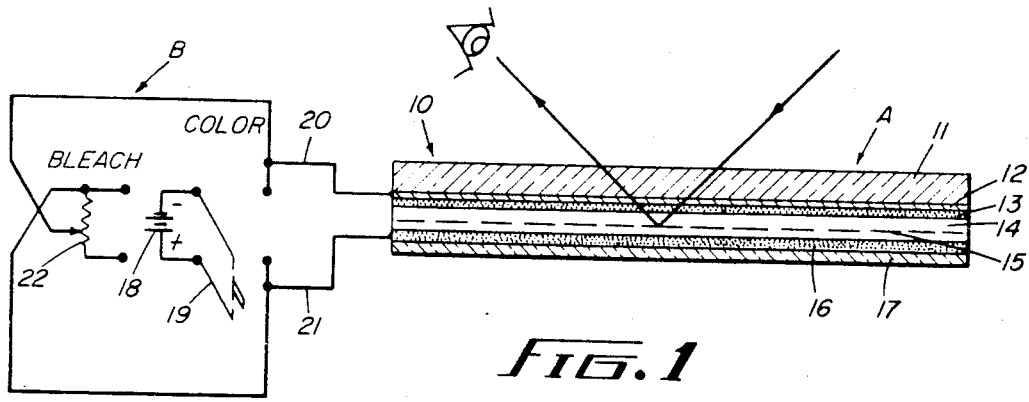
FIG. 1 is a cross-sectional drawing of a mirror according to the invention showing the electrical connections.

Referring to FIG. 1, the variable reflectance mirror of the present invention consists of a sandwich arrangement with a transparent electrode 10 which is a sheet of NESA glass, having a glass base 11, with a tin oxide film 12. A film of electrochromic material 13 is deposited on tin oxide film 12. The electrolyte 14 is in contact with electrochromic film 13 and the reflecting surface 15. The reflecting surface 15 consists of a metallic layer having pores from front to back, which can be formed in various ways. Surface 15 could be a sheet of chromium with holes drilled through it; it could alternatively be a layer of chromium, gold, platinum or the like, evaporated through a screeen onto a porous glass substrate. The pores of reflecting surface 15 are of such size that they allow the electrolyte 14 to permeate, but do not adversely affect the light reflecting properties of the surface. The counter electrode 16 is in contact with mirror surface 15. A sheet 17 of any suitable inert, non-conducting material is used to close the back of the mirror structure, e.g., plastic or glass, and the edges are sealed by any suitable inert material, not shown. The mirror A is connected to an electrical circuit B which is shown as a simple battery 18 and switch 19. Mirror A is connected to switch 19 through electrical leads 20 to the electrochromic film 13, and 21 to the counter electrode 16. A resistance 22 may be used in the circuit as shown. Electrical manual circuit B is a simple switching circuit for operating the electrochromic mirror A.

Figure 2:
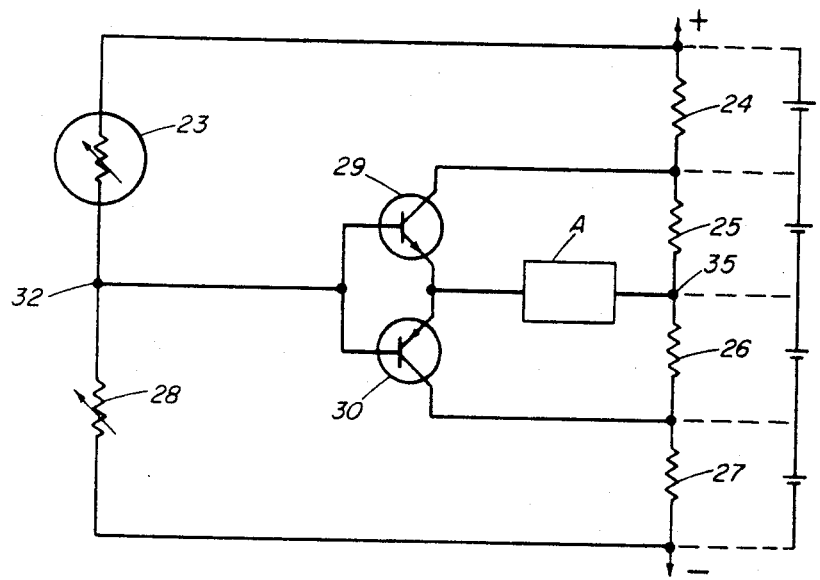
FIG. 2 is a schematic diagram of the photoelectric control circuit.
Figure 3:
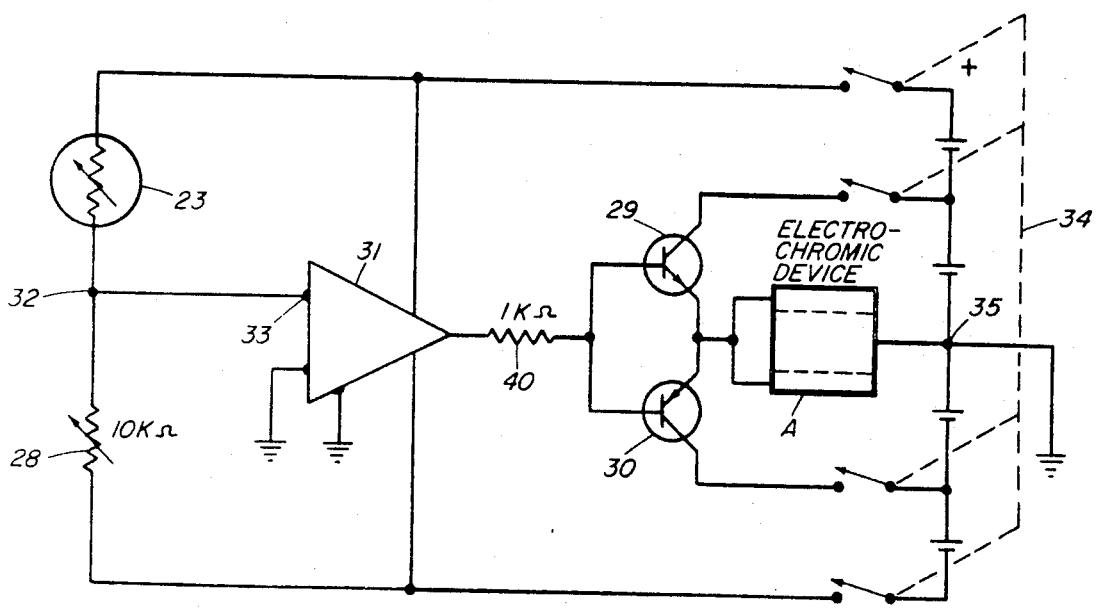
FIG. 3 is an electrochromic device control circuit including an operational amplifier.

With reference to FIGS. 2, and 3 the electrochromic mirror is made lighter or darker by passing current of the proper polarity through the device by means of a circuit controlled by the light to be reflected. In FIG. 2, the control circuit controls both current and polarity according to the amount of light falling on the photocell 23. The supply voltage is dropped through resistors 24, 25, 26 and 27 so that proper minor operating voltage occurs across resistors 25 and 26. At low light levels, the resistance of the photocell 23 is high compared to the vanable resistor 28 and the transistor's 29 and 30 are base biased negative causing 29 to conduct and 30 is turned off. Conversely, at high levels the transistors 29 and 30 are base biased positive causing 30 to conduct and turning off 29. Separate voltage sources such as batteries could be used to replace resistors 24, 25, 26 and 27.

The NPN and PNP transistors connected as in FIG. 2 acts essentially as a single pole, double throw, center off switch. The potential of the emitters is essentially the same at point 35 due to the low resistance path through the electrochromic device. The base potential 32 will depend on the resistances of photocell 23 and variable resistor 28. If they are equal the potential at point 32 will be the same as at point 35 and neither 29 nor 30 will conduct. When the light level on photocell 23 increases its resistance will decrease and the transistor bases will become somewhat positive with respect to 35 allowing 29 to conduct and the electrochromic device will darken. Conversely when the light level decreases, the base potential at 32 will become negative with respect to 35 and transistor 30 will conduct. The variable resistor 28 is used to balance the resistance of the photocell at the light level where switching is desired.

FIG. 3 exhibits the operation of the circuit shown in FIG. 2 in which an operational amplifier 31 amplifies the voltage seen between the photocell-variable resistor junction 32 and ground 35. The gain of such an operational amplifier can be adjusted from less than one to several thousand. Thus the control circuit can be very sensitive to slight changes in light level. Moreover, if the photocell is placed so that it sees light passing through or reflected from the electrochromic device, it can hold light transmission or reflection to a constant value despite large changes in incident light level.

The circuit includes a resistance 34 and ganged switches 34. While FIG. 3 illustrates use of an RCA CA 3010 amplifier and transistor types 2N1605 and 2N404, and a cadmium photocell type 905L, it will be obvious than any equivalent commercially available types may be used.

In the RCA CA 3010 pin 33 is the non-inverting input. If an operational amplifier's inverting input were used (output polarity would be opposite the input polarity) then the positions of the photocell and 10k Ω variable resistor would be interchanged.

While certain specific embodiments have been set forth for the invention for the sake of illustration to persons skilled in the art, these are not intended to be limitative.

I claim:

1. A radiation reflective device having an electric field responsive transmitting characteristic comprising in a sandwich layered arrangement:
    a. a transparent conductive electrode for transmitting radiation,
    b. a persistent electrochromic material in contact with said transparent conductive electrode,
    c. an electrolyte in contact with said persistent electrochromic material,
    d. a porous, radiation reflective layer disposed in said electrolyte for reflecting said radiation, and
    e. a counter electrode in contact with said electrolyte, said device being adapted to have an electric field established between said electrodes.

2. The device of claim 1 wherein said persistent electrochromic material is tungsten oxide.

3. The device of claim 1 wherein said persistent electrochromic material is molybdenum oxide.

4. A variable light transmission process as defined in claim 1 comprising control means coupled to said device for selectively applying across said electrodes a potential of one polarity, a potential of opposite polarity and an effective short circuit.

5. The device of claim 4 wherein at least one of the selectively applied potential is variable over a given range.

6. The device of claim 5 wherein said control means is put into operation by photoactivatable means activated by the radiation to be reflected.

7. The device of claim 1 wherein said counter electrode comprises a persistent electrochromic material.

* * * * *